United States Patent Office 3,544,413
Patented Dec. 1, 1970

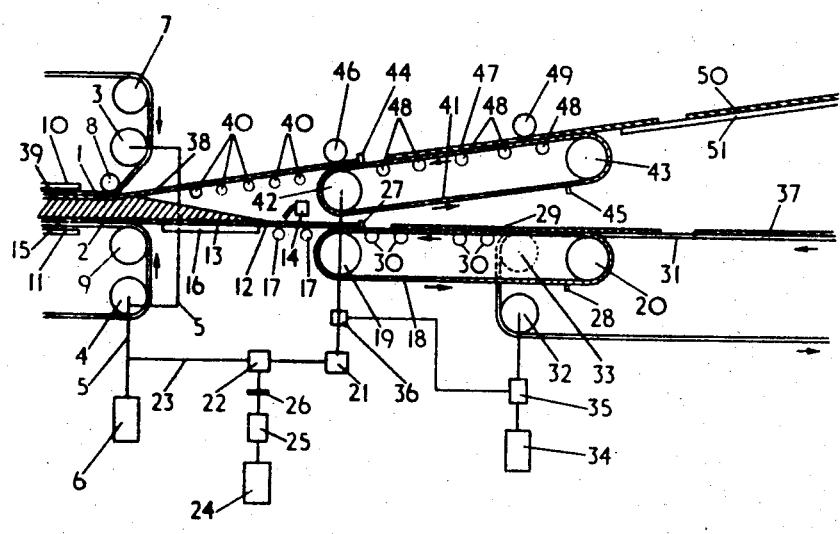

3,544,413
MANUFACTURE OF LAMINATED ARTICLES
William Raymond Clegg and Harry Edwards, Manchester, England, assignors to Imperial Chemical Industries, Limited, London, England, a corporation of Great Britain
Filed Nov. 8, 1967, Ser. No. 681,381
Claims priority, application Great Britain, Nov. 10, 1966, 50,473/66
Int. Cl. B65c 9/40; B32b 31/00
U.S. Cl. 156—363
9 Claims

ABSTRACT OF THE DISCLOSURE

Modified apparatus for the continuous manufacture of laminated foam articles in which at least one of the facing sheets is in the form of discontinuous panels. The apparatus incorporates means whereby panels which are fed initially onto a conveyor at randomly-spaced intervals are thereafter caused to move relatively to one another to bring their adjacent edges into abutment before they are conveyed into contact with the foam-forming ingredients.

---

This invention relates to the manufacture of laminated articles and more particularly to the continuous manufacture of laminated articles having a plastic or resinous foam core.

It is already known to manufacture laminated articles having a core consisting of a plastic or resinous foam, for example polyurethane foam, one or both surfaces of which are bonded to an outer sheet of facing material. A machine suitable for the continuous manufacture of such laminated articles consists essentially of a conveyor system and a foam dispensing unit. The conveyor system serves to bring the sheets of facing material into the correct disposition and to hold them in this position while the foam core is formed upon or between them. In practice, when two sheets of facing material are used, the sheets are disposed one above the other and at a distance apart equal to the thickness of foam core which is desired in the final laminated article. Before the sheets are brought into this disposition a layer of foam-forming ingredients is applied to the lower of the two sheets by means of the foam dispensing unit. The sheets are then brought into the correct disposition by means of the conveyor system, whereby the foam-forming layer comes into contact with the upper of the two sheets, after which the formation and setting of the foam core is completed, optionally under the accelerating influence of heat.

The conveyor system of a machine suitable for the continuous manufacture of the said laminated articles may consist, for example, of upper and lower conveying surfaces, which are parallel to each other and move in co-operation with each other. The conveying surfaces are formed from endless belts of suitable material and are driven in co-operation with each other by some suitable means. The endless belts may be composed of woven fabric or of wire mesh which may if desired be covered with rubber or with a plastic material. The conveying surfaces are backed and supported by platens, the gap between which determines the thickness of the resulting laminate. In one known type of machine the platens are fixed and are normally heated for the purpose of accelerating the formation and curing of the foam core. In another known type of machine the platens are of the 'floating' type, that is to say they are capable of some degree of vertical movement in response to fluctuations in the thickness of the foam core, and in such a type the platens are not heated.

A variety of facing materials may be employed in the manufacture of such laminated articles; suitable materials are, for example, paper, wood, plastics, metal, rubber, paperboard, plasterboard and asbestos cement board. These materials may be in form of continuous lengths or discontinuous panels, according to their nature, in the case of flexible facing materials, such as paper and rubber, these are conveniently supplied in roll form and fed continuously from the roll to the laminating machine, the finished laminate thus emerging from the machine also as a continuous strip which is subsequently cut into lengths as required. In the case of the more rigid facing materials, such as wood and asbestos board, these can only be supplied in the form of discontinuous panels and the panels must be individually fed in succession into the laminating machine. In the interests of the smooth operation of the machine, it is desirable that the flow of foam-forming ingredients from the dispensing unit onto the lower facing material should not be interrupted during the course of a run; in particular, when the lower facing material consists of discontinuous panels, it is not desirable to interrupt the flow between completing the application of the layer of ingredients to one such panel and commencing the application of a layer to the succeeding panel. In order, therefore, to avoid contamination of the exterior surfaces of the panels and a reduction in the thickness of the finished laminates at their leading and trailing edges due to loss of the ingredients at those edges, it is necessary that successive panels of the facing material should be fed into the laminating machine with adjacent leading and trailing edges in substantially close abutment.

When panels of facing material, which will normally be of substantially uniform size, are being fed into the machine by hand, it is comparatively straightforward to arrange that successive panels are loaded onto the appropriate conveying means with adjacent edges in close abutment, but when mechanical means are employed for loading the panels onto the conveyor system, it is difficult to ensure that the operation is always carried out with the necessary degree of accuracy. As a consequence of random error, some pairs of successive panels may be laid down on the conveyor with a slight gap between them, while others may be laid down with no gap at all or even a slight overlap.

A laminating machine has now been devised incorporating means whereby successive panels of facing material, although initially loaded onto the conveyor system so as to be spaced apart at random intervals, are caused to move relatively to each other so as to bring their adjacent edges into substantially close abutment before the panels are brought into contact with the foam-forming ingredients.

Thus according to the present invention there is provided apparatus for the continuous manufacture of laminated articles consisting of a core of plastic or resinous foam material one or both surfaces of which are bonded to an outer sheet of facing material, at least one of the said sheets being in the form of discontinuous panels, the said apparatus comprising means for conveying one of the said sheets, a foam dispensing means for applying a layer of foam-forming ingredients to the surface of the said sheet, and optionally means for conveying the other of the said two sheets adapted to bring that other sheet into contact with the surface of the layer of foam-forming ingredients, characterised in that each means for conveying a facing sheet which is in the form of discontinuous panels includes means whereby panels fed initially onto the said conveying means at random longitudinal intervals are thereafter caused to move relatively to one another so that their adjacent edges are brought into substantially close abutment before they are conveyed into contact with the foam-forming ingredients.

The conveying means for a facing sheet which is in the form of discontinuous panels as hereinabove defined may conveniently consist of two co-operating elements, namely a main conveyor and a register conveyor. The main conveyor is driven at a constant linear speed and the panels are thereby successively conveyed into contact with the foam-forming ingredients. The register conveyor is mounted so as to precede the main conveyor and serves to transfer panels, which are fed onto it at random longitudinal intervals, onto the main conveyor. The means whereby the register conveyor is driven is such as to cause it to move at a speed which varies in a regular manner dependent upon the position of facing panels in relation to both the register conveyor and the main conveyor, namely in such a way that during the time that any one panel is engaged by both the main conveyor and the register conveyor the speeds of the two said conveyors are synchronised, while as soon as the said panel is disengaged by the register conveyor the speed of that conveyor is increased relatively to that of the main conveyor for a sufficient period of time to bring into close abutment with the trailing edge of the said panel the leading edge of the succeeding panel.

The main and register conveyors may both be endless belts composed of woven fabric or of wire mesh, covered if desired with a suitable flexible material such as rubber or a plastic. It is, however, preferred that while the main conveyor may be of this type, the register conveyor should be of a type permitting a more positive engagement with the facing panels. A particularly suitable form of register conveyor comprises one or more endless chains each having attached thereto two or more upstanding members adapted to engage and urge forwards the trailing edge of a panel, the peripheral distance around the chain between consecutive upstanding members on a chain being greater than the maximum longitudinal interval between the trailing edges of consecutive panels fed onto the said conveyor, together with means for supporting successive panels in proximity to the chain or chains during their forward movement towards the main conveyor. The means for supporting the panels preferably comprises one or more series of free-running rollers mounted alongside the chains and transversely to their direction of movement.

The means whereby the register conveyor is driven in such a way as to cause its speed to vary in the above-defined regularly varying manner preferably comprises driving means whereby a constant torque is applied to the said conveyor. The load on the conveyor will vary regularly in the course of its motion between two limits, the lower limit obtaining so long as a given facing panel is separated from the preceding panel by a gap and can thus be freely urged forward by the conveyor, and the upper limit obtaining when the first-mentioned panel has been brought into abutment with the preceding panel and is being constrained to move in synchronism therewith. If the magnitude of the constant torque applied to the register conveyor is suitably selected, the conveyor can be caused to move at a speed synchronous with that of the main conveyor whenever the load is at the upper limit, and then whenever the load falls to the lower limit the register conveyor will automatically be accelerated.

A constant torque may conveniently be applied to the register conveyor by means of a suitable power unit such as an electric motor connected to the conveyor through a constant torque eddy current coupling. Such couplings are well known in engineering practice and incorporate means whereby the magnitude of the constant torque to be applied to the driven member may be accurately selected at will. It will be appreciated, however, that in the apparatus of the invention the register conveyor moves during the greater part of its total operating time as the same speed as the main conveyor, the periods of higher speed operation being comparatively short and infrequent; consequently the eddy current coupling will operate for the greater part of the time so as to dissipate a substantial proportion of the energy applied to it by the power unit. Since the power required to drive the register conveyor may be quite high, the energy loss involved may be considerable. For this reason a preferred arrangement for driving the register conveyor at constant torque is one in which the drive thereto has two components; namely, a constant speed driving means which is mechanically coupled direct to the conveyor and which provides the greater part of the driving power, and a second constant speed driving means which is connected to a constant torque eddy current coupling, the output from which is combined with the drive from the first driving means through a differential mechanism such as an epicyclic gearbox. When this preferred arrangement is employed, it is advantageous to incorporate in the final drive from the differential mechanism to the register conveyor a means for effecting slight adjustments in the speed of the conveyor relative to the speed of the drive, for example an infinitely-variable speed gearbox; this means enables the speed of the register conveyor, when working at the upper load limit discussed in the foregoing paragraph, to be exactly synchronised with that of the main conveyor.

It will be understood that the present invention is applicable when either the upper facing sheet or the lower facing sheet, or both, are in the form of discontinuous panels. In the case where both upper and lower sheets are in panel form, the upper panels will normally be of the same substantially uniform size as the lower panels and it is desirable that the two series of panels should move into that part of the laminating machine where they are brought into contact with the foam-forming ingredients in register, that is to say in such a way that in the finished laminate the joints between successive upper panels are in line with the joints between successive lower panels. Such an arrangement facilitates the subsequent separation of the laminate into individual laminated panels, since it is then necessary to cut through the foam core only rather than through the core and one of the facing panels. This object may be achieved in the apparatus of the invention by providing means for synchronising the movements of the register conveyors forming part of the conveying means for the upper and lower facing panels respectively, so that opposing pairs of panels are always transferred to the main conveyors with their trailing edges in register.

Thus according to a further feature of the present invention there is provided apparatus for the continuous manufacture of laminated articles as hereinbefore defined, both facing sheets being in the form of discontinuous panels of substantially uniform size, characterised in that means are provided for synchronising the movement of the register conveyor forming part of the means for conveying the upper facing sheets with the movement of the register conveyor forming part of the means for conveying the lower facing sheets so that opposing pairs of panels are always transferred to the main conveyors with their trailing edges in register.

In the case where the register conveyors are both of the preferred type hereinbefore described, that is to say where they consist of endless chains having upstanding engaging members, synchronisation of the two conveyors may readily be achieved by mechanically coupling them so that the upstanding members themselves move in register with one another; the two conveyors may thus conveniently be connected to a common driving means of the type hereinbefore described. It is preferred that both upper and lower register conveyors should be driven from their forward ends, that is to say the ends nearest to the main conveyors, in order to ensure that any slack in the register conveyors occurs in those parts thereof which are not in engagement with the facing panels and so does not interfere with their mutual registration.

Since the synchronising means just described brings into registration the trailing edges of corresponding upper and lower facing panels, it follows that close abutment of adjacent panel edges in both the upper and lower facings will be achieved by the apparatus of the invention only when the panels are all of exactly uniform length. In practice, the panels supplied to the machine may vary slightly in length; it is thus possible for a given upper panel to be longer than the corresonding lower panel, in which event when close abutment of the leading edge of that upper panel with the upper panel preceding it has been effected, there will remain a gap between the corresponding lower panels. This situation is undesirable since it prevents the push exerted on a given lower facing panel by the register conveyor being transmitted to the preceding panel, whereby that panel may be urged forward until such time as it has become engaged by the main conveyor. In order to ensure that during the operation of the apparatus mechanical contact is always maintained between adjacent lower panels after the abutment operation has been carried out, it is preferred to attach short spacing members to the leading edge of each panel fed onto the lower conveying means, the spacing members having a thickness at least equal to the maximum variation in length of the facing panels supplied. The spacing members may conveniently be made from a plastic material, of such a shape as to enable them to be clipped onto the panel edges; such a material will not impede the operation of separating the completed laminated panels. Any tendency for the foam-forming ingredients subsequently applied to the lower facing to be lost through the gaps between the adjacent edges of panels at the points where these are not bridged by spacing members may be prevented by incorporating in the apparatus means for applying a length of adhesive tape across the entire width of the joint.

For convenience in feeding facing panels into the apparatus of the invention by mechanical means, for example by means of suction pads, it is desirable that each register conveyor should be preceded by a feed conveyor onto which the panels may initially be loaded at the desired intervals and by which they are then transferred to the register conveyor. The feed conveyor may conveniently be of a conventional endless belt type similar to the main conveyors. It is driven so as always to move at the same speed as the register conveyor and for this purpose it may, if desired, be mechanically coupled to that conveyor. However, in order to avoid imposing too great a load on the register conveyor drive, it is preferred to provide the feed conveyor with an independent power unit which operates through a further constant torque eddy current coupling, the coupling in this instance being arranged to respond to a speed sensing means, such as a tacho generator, mounted upon the power drive to the register conveyor, whereby the speeds of the two conveyors may always be kept in synchronism. The feed conveyor and the register conveyor may conveniently overlap to some extent to facilitate transfer of the facing panels from the one to the other.

In order to provide adequate space for access to the lower register and feed conveyors, it is preferred that the corresponding upper conveyors are arranged to slope downwardly towards the upper main conveyor; in this case the upper feed conveyor may operate solely under the influence of gravity. Some provision may then be necessary to urge the upper facing panels downwardly into contact with the upper register conveyor so as to ensure that they are engaged by the upstanding members thereon; further rollers arranged to bear upon surfaces of the panels may suitably be used for this purpose.

The laminated articles with which this invention is concerned have a plastic or resinous foam core which may be formed from any suitable foam-forming composition and may be either flexible or rigid. It is particularly preferred, however, that the foam core consists of polyurethane. The polyurethane may be obtained in known manner from a suitable mixture of polyurethane-forming ingredients such as polyesters or polyethers with a polyisocyanate, water, catalysts, surfactants, blowing agents and other ingredients.

The apparatus of the invention will now be illustrated by a description of a preferred embodiment thereof, with reference to the accompanying drawing which displays schematically the essential components of the embodiment, including the driving and control mechanism.

In the drawing, upper and lower conveying surfaces 1 and 2 respectively, constituting the main conveyors, are driven in the directions indicated by the arrows by rollers 3 and 4 which are coupled through a suitable transmission 5 to an electric motor 6; idling rollers 7, 8 and 9 are provided to guide the conveying surfaces, which pass between upper and lower platens 10 and 11 respectively. A panel of facing material 12 is shown in the position in which a layer of foam-forming ingredients 13 is applied thereto by means of a dispensing unit 14; the facing panel 12 is in this position carried at its forward end upon the lower conveying surface 2, its leading edge being in abutment with the trailing edge of the preceding lower facing panel 15. The central portion of the panel 12 in the position shown is supported by a platen 16 and idling rollers 17; the rearward end of the panels is carried upon a register conveyor comprising an endless chain 18 which passes round a driving sprocket 19 and an idling sprocket 20 and is driven in the direction indicated by the arrows. The driving sprocket 10 is coupled through a variable speed gearbox 21 to an epicyclic gearbox 22, which is driven by two inputs. One input is derived from the motor 6 through a transmission 23. The other input is derived from a second motor 24 through a constant torque eddy current coupling 25 and a reverse braking unit 26, the latter of which permits the shaft from the coupling 25 to the epicyclic gearbox 22 to rotate only in the direction in the direction in which it turns when transmitting power from the motor 24. The chain 18 carries two upstanding lugs 27 and 28 spaced equidistantly about its periphery. The lug 27 is shown in engagement with the trailing edge of the panel 12. The forward end of the succeeding lower facing panel 29 is carried upon idling rollers 30 immediately above the chain conveyor 18, its leading edge being separated from the lug 27 and the trailing edge of the panel 12 by a suitable interval. The length of the chain conveyor 18 is selected so that the peripheral distance between the lugs 27 and 28 is slightly greater than the distance between the trailing edges of successive facing panels when the panels are separated by the aforesaid interval. The rearward portion of the panel 29 is carried upon the feed conveyor 31, which partly overlaps the chain conveyor 18. The feed conveyor is driven in the direction indicated by the arrows by means of a driving roller 32 and is supported by an idling roller 33. The roller 32 is driven by an electric motor 34 through a constant torque eddy current coupling 35' which is controlled by the output of a tacho generator 36 mounted on the drive from the variable speed gearbox 21, in such a way that the speeds of the feed conveyor 31 and the register conveyor 18 are always synchronised. Further lower facing panels (of which one is shown at 37) are supported upon the feed conveyor, each being separated from its neighbours by approximately the same interval as that separating panels 12 and 29.

An upper facing panel 38 is in registration with the lower panel 12 and is shown in the position where it is being brought into contact with the upper surface of the layer of foam-forming ingredients 13; the forward end of the panel 38 is engaged by the upper main conveyor 1 and its leading edge is in abutment with the trailing edge of the preceding upper panel 39. The panel 38 is supported on an inclined series of idling rollers 40 and its rearward end is carried upon an inclined chain register conveyor 41, of a similar pattern and dimensions to the conveyor 18, which passes round a driving sprocket 42 and an idling sprocket 43 and is provided with upstanding lugs 44 and 45 which are in exact registration with the lugs 27 and 28 on the chain 18. The conveyor 41 is driven in synchronism with the conveyor 18 by a suitable mechanical connection between the sprockets 19 and 42. The trailing edge of the panel 38 is engaged by the lug 44, the panel being held in proximity to the chain 41 by means of a restraining roller 46. The forward end of the succeeding upper panel 47 is supported above the chain 41 by a further inclined series of idling rollers 48 with which it is held in contact by a second restraining roller 49. Further upper panels (of which one is shown at 50) are fed at similar intervals to those separating the lower panels down an inclined gravity conveyor 51.

When the apparatus is in operation, facing panels are loaded (by mechanical means not shown in the drawing) at the aforesaid approximately equal intervals onto the feed conveyor 31 and the gravity conveyor 51. The panels then move, retaining the same spacing relationship, towards the chain register conveyors 18 and 41. From a position such as that shown in the drawing, the conveyors, 1, 2, 18, 31 and 41 will all move at the same speed and the panels will progress forwards, still maintaining the same spacing, until the lugs 27 and 44 which engage the trailing edges of the panels 12 and 38 respectively move away downwards and become disengaged from those panels. The load on the conveyors 18 and 41 then decreases, and, under the influence of the constant torque applied through the transmission connecting the motors 6 and 24 to the driving sprocket 19, the conveyors will accordingly accelerate. The lugs 28 and 45 will thus be brought up behind the trailing edges of the panels 28 and 47 and will urge these panels forwards until their leading edges are in abutment with the trailing edges of the panels 12 and 38 respectively. During this accelerated movement, the conveyor 31 is similarly accelerated. When abutment has been achieved, the resistance offered by the panels 12 and 38, which are already engaged by the main conveyors 1 and 2, restores the load on the chain conveyors to its previous value. The five conveyors then resume their previous synchronised movement, until the lugs and 28 and 45 become in their turn disengaged from the panels 29 and 47 and the cycle is repeated. During the periods when the chain conveyors 18 and 41 are moving at the same speed as the main conveyors 1 and 2, any tendency of the transmission 23 from the motor 6 to drive the motor 24 in reverse through the coupling 25 is prevented by the reverse braking unit 26. After abutment of the panels has been achieved, the upper and lower panels continue to move forward under the influence of the main conveyors, the lower panel receiving the layer of foam-forming ingredients from the dispensing unit 14 and the upper panel being brought into contact with the upper surface of the layer on passing beneath the roller 8, after which the resulting laminate is carried further by the conveyors 1 and 2 between the platens 10 and 11 until curing of the foam core is completed.

We claim:

1. In an apparatus for the continuous manufacture of laminated articles consisting of a core of plastic material each surface of which is bonded to an outer sheet of facing material, at least one of the said sheets being in the form of discontinuous panels, the said apparatus comprising means for conveying one of the said sheets, a foam dispensing means for applying a layer of foam-forming ingredients to the surface of the said sheet, means for conveying the other of the said sheets adapted to bring that other sheet into contact with the surface of the layer of foam-forming ingredients, the improvement which consists in that each means for conveying a facing sheet which is in the form of discontinuous panels consists of a main conveyor serving to convey the panels successively into contact with the foam-forming ingredients and a register conveyor mounted so as to precede the main conveyor and serving to transfer onto that conveyor panels which are fed onto the register conveyor at random longitudinal intervals, the main conveyor being driven at a constant speed and the register conveyor being driven at a speed which varies in a regular manner such that during the time that any one panel is engaged by both the main conveyor and the register conveyor the speeds of the two said conveyors are synchronised, while as soon as the said panel is disengaged by the register conveyor the speed of that conveyor is increased relatively to that of the main conveyor for a sufficient period of time to bring into close abutment with the trailing edge of the said panel the leading edge of the suceeding panel.

2. Apparatus as claimed in claim 1, wherein the main conveyor is in the form of an endless belt.

3. Apparatus as claimed in claim 1, wherein the register conveyor comprises at least one endless chain having attached thereto at least two upstanding members adapted to engage and urge forwards the trailing edge of a panel, the peripheral distance around each chain between consecutive upstanding members on the chain being greater than the maximum longitudinal interval between the trailing edges of consecutive panels fed onto the said conveyor, together with means for supporting successive panels in proximity to the chain during their forward movement towards the main conveyor.

4. Apparatus as claimed in claim 3, wherein the means for supporting the panels during their forward movement comprises at least one series of free-running rollers mounted alongside the chain and transversely to its direction of movement.

5. Apparatus as claimed in claim 1, wherein the driving means for the register conveyor consists of a first component which is a constant speed driving means coupled to the conveyor through a differential mechanism and a second component which is a constant speed driving means connected to a constant torque eddy current coupling, the output from which coupling is combined with the drive from the first component through the said differential mechanism.

6. Apparatus as claimed in claim 1 for the continuous manufacture of laminated articles in which both facing sheets are in the form of discontinuous panels of substantially uniform size, wherein means are provided for synchronising the movement of the register conveyor forming part of the means for conveying the upper facing sheets with the movement of the register conveyor forming part of the means for conveying the lower facing sheets so that opposing pairs of panels are always transferred to the main conveyors with their trailing edges in register.

7. Apparatus as claimed in claim 1, wherein each register conveyor is preceded by a feed conveyor onto which the panels are initially loaded at random longitudinal intervals and by which they are then transferred to the register conveyor.

8. Apparatus as claimed in claim 7, wherein the feed conveyor is an endless belt driven so as to move always at the same speed as the register conveyor.

9. Apparatus as claimed in claim 7, wherein the upper register conveyor and feed conveyor are arranged to slope downwardly towards the upper main conveyor.

References Cited

UNITED STATES PATENTS

| 3,167,603 | 1/1965 | Lillie | 264—47 |
| 3,170,827 | 2/1965 | Voelker | 156—78 |

FOREIGN PATENTS

| 1,176,834 | 8/1964 | Germany | 156—79 |

SAMUEL FEINBERG, Primary Examiner